US009676994B2

(12) United States Patent
Kuipers

(10) Patent No.: US 9,676,994 B2
(45) Date of Patent: Jun. 13, 2017

(54) FRACTURING FLUID FOR SECONDARY GAS PRODUCTION

(71) Applicant: Kenda Capital B.V., Den Haag (NL)

(72) Inventor: Edgar Kuipers, Den Haag (NL)

(73) Assignee: Kenda Capital B.V., Den Haag (NL)

( * ) Notice: Subject to any disclaimer, the term of this patent is extended or adjusted under 35 U.S.C. 154(b) by 219 days.

(21) Appl. No.: 14/399,928

(22) PCT Filed: May 7, 2013

(86) PCT No.: PCT/NL2013/050343
§ 371 (c)(1),
(2) Date: Nov. 7, 2014

(87) PCT Pub. No.: WO2013/169103
PCT Pub. Date: Nov. 14, 2013

(65) Prior Publication Data
US 2015/0101807 A1    Apr. 16, 2015

Related U.S. Application Data

(60) Provisional application No. 61/643,954, filed on May 8, 2012.

(30) Foreign Application Priority Data

May 8, 2012 (EP) .................................... 12167148

(51) Int. Cl.
*E21B 43/26* (2006.01)
*C09K 8/62* (2006.01)
(Continued)

(52) U.S. Cl.
CPC ................ *C09K 8/80* (2013.01); *C09K 8/64* (2013.01); *E21B 43/2405* (2013.01); *E21B 43/26* (2013.01); *E21B 43/267* (2013.01)

(58) Field of Classification Search
None
See application file for complete search history.

(56) References Cited

U.S. PATENT DOCUMENTS

| 2,822,872 A * | 2/1958 | Rzasa ...................... C09K 8/58 166/401 |
| 3,527,585 A * | 9/1970 | Ungerleider ............. C10K 3/06 137/6 |

(Continued)

FOREIGN PATENT DOCUMENTS

CA    2639539 A1    3/2010

OTHER PUBLICATIONS

International Search Report of PCT/NL2013/050343 mailed Jun. 14, 2013.

*Primary Examiner* — Angela M DiTrani
(74) *Attorney, Agent, or Firm* — Gilberto M. Villacorta; Sunit Talapatra; Foley & Lardner LLP

(57) ABSTRACT

A process for fracturing a subterranean formation using a mixture of methane and propane/butane is provided. The process comprises:
 (a) providing a first fluid (in a gas or liquefied form) comprising at least 50 wt. % of methane;
 (b) providing a second fluid (in a gas or liquefied form) comprising at least 50 wt % of the combination of propane and butane;
 (c) mixing and, in case of a gas mixture, liquefying the first fluid and the second fluid to obtain a liquefied fluid mixture comprising 15-80 wt. % of methane and 15-80 wt. % of the combination of propane and butane, in which the liquefied mixture has a temperature and a pressure such that the liquefied fluid stays above the bubble point of the mixture;
 (d) blending a proppant and/or a gallant into the liquefied fluid mixture to produce a fracturing fluid; and
(Continued)

(e) injecting the fracturing fluid into the subterranean formation.

22 Claims, 1 Drawing Sheet

(51) Int. Cl.
*C09K 8/80* (2006.01)
*C09K 8/64* (2006.01)
*E21B 43/267* (2006.01)
*E21B 43/24* (2006.01)

(56) References Cited

U.S. PATENT DOCUMENTS

| | | | |
|---|---|---|---|
| 3,822,747 A | 7/1974 | Maguire, Jr. | |
| 6,511,944 B2 | 1/2003 | Taylor et al. | |
| 8,513,166 B2 * | 8/2013 | Gatlin | C07F 15/025 |
| | | | 166/308.1 |
| 2005/0189112 A1 * | 9/2005 | Taylor | C09K 8/82 |
| | | | 166/278 |
| 2005/0204625 A1 * | 9/2005 | Briscoe | C10L 3/003 |
| | | | 48/127.3 |
| 2006/0065400 A1 * | 3/2006 | Smith | E21B 43/26 |
| | | | 166/308.1 |
| 2010/0011663 A1 * | 1/2010 | Coyle | F25J 1/0022 |
| | | | 48/127.3 |
| 2010/0051272 A1 | 3/2010 | Loree et al. | |
| 2010/0101796 A1 | 4/2010 | Leshchyshyn et al. | |
| 2012/0000660 A1 | 1/2012 | Gatlin et al. | |
| 2013/0228330 A1 * | 9/2013 | Loree | E21B 21/063 |
| | | | 166/267 |

* cited by examiner

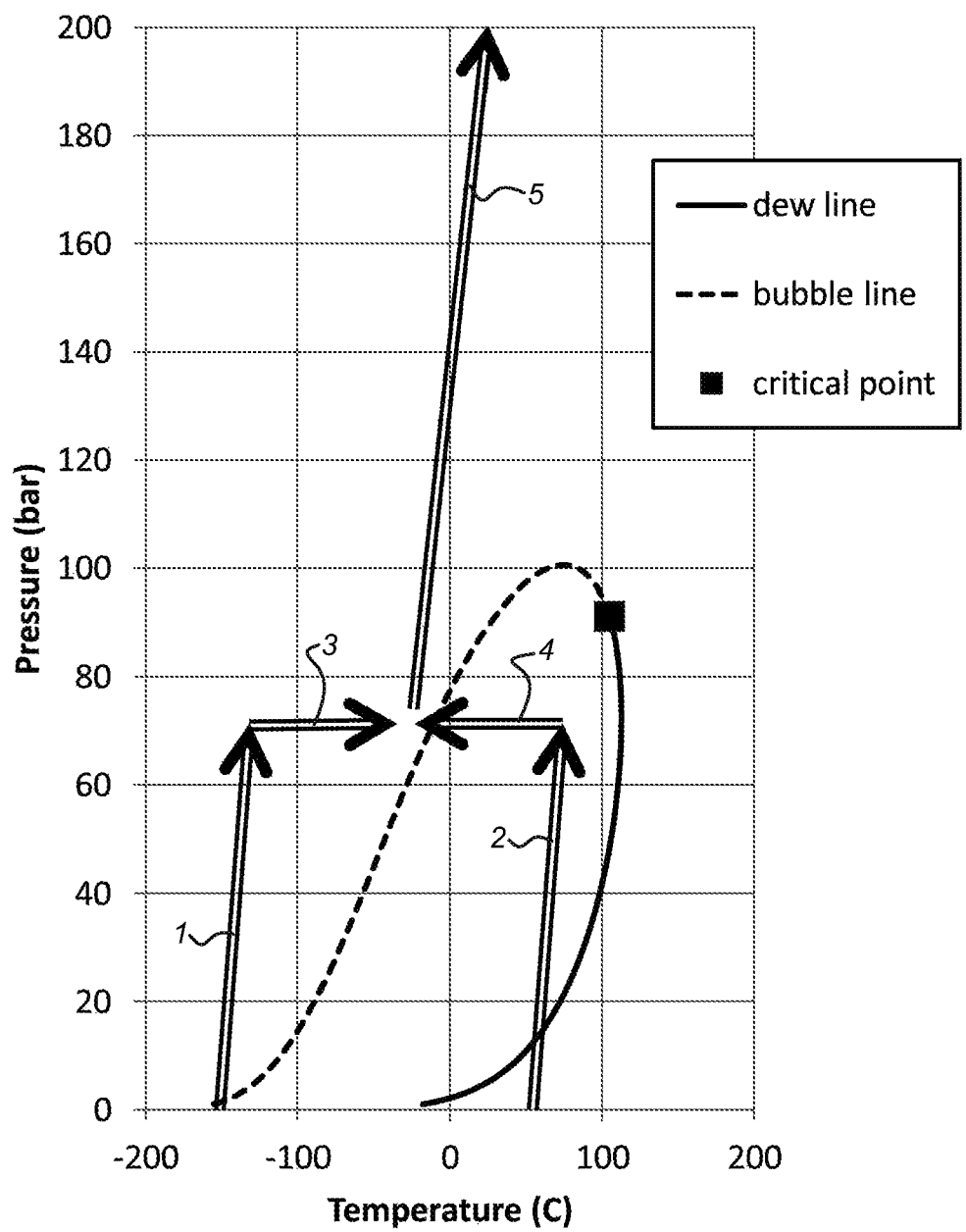

FRACTURING FLUID FOR SECONDARY GAS PRODUCTION

CROSS REFERENCE TO RELATED APPLICATIONS

The present application is a National Stage of International Application No. PCT/NL2013/050343 filed on May 7, 2013, which was published on Nov. 14, 2013, as WO 2013/169103 A1, which claims the benefit of European Application No.: 12167148.1 filed May 8, 2012 and U.S. Application No. 61/643,954 filed May 8, 2012, the entire disclosures of which are incorporated herein by reference.

The invention relates to a fracturing fluid for opening up a difficultly accessible subterranean gas or oil reservoir and thus enhancing gas or oil recovery.

BACKGROUND

As is well known in the industry, many wells require "stimulation" in order to promote the recovery of hydrocarbons from the production well. This stimulation is commonly done via a method called "fracturing" or "fracking", where the propagation of fractures is stimulated via the down-hole injection of a pressurized fluid. To keep this fracture open after the injection stops, a solid proppant, commonly a sieved round sand, is usually added to the fluid.

The injected fracking fluid is typically water. Chemical additives are applied to tailor the injected material to the specific geological situation, protect the well, and improve its operation, though the injected fluid is approximately 98-99.5% percent water.

Water as a fracturing fluid has many drawbacks. First, large quantities of water are needed, hydraulic fracturing typically requires millions of gallons of water per well. Usually this water needs to be trucked in and after fracturing some of the injected water returns to the surface once the well starts production. This produced water will be contaminated and needs to be treated and disposed. Supply and disposal of such large quantities of water is costly and also increases the environmental impact of fracturing if only because of the large number of trucks that are involved with water supply and disposal.

Secondly, water, once injected into the pores, can be difficult to remove and/or causes swelling, blocking the pores, reducing the hydrocarbon productivity. Water can also react with the minerals, the salts and native water and hydrocarbons down-hole, resulting in e.g. reservoir contamination. Cleaning up the well after hydraulic fracturing often requires flaring of early production.

The use of a liquefied petroleum gas (LPG), commonly a mixture of propane and butane and minor other components, as a fracturing fluid does not have the same drawbacks as water. The preparation and use of LPG laden with gelled proppant as a fracturing fluid is described e.g. in US 2010/0051272, CA 2639539, US 2012/0000660 and US 2005/0189112. LPG has a lower density than water; hence less tonnage needs to be trucked in for the same volume of fracturing liquid. LPG is a liquid when pressurized and injected into a reservoir, as long as the temperature of the injected fluid stays below its critical temperature. When the pressure is released, the LPG will vaporize and/or blend with the native hydrocarbons, hence no residual fracturing liquid will remain in the pores.

Unlike water, LPG will also not react down-hole and/or cause swelling and blocking of the pores in the reservoir. The vaporized LPG will stay in the reservoir until it is evacuated together with the native hydrocarbons and brought to market usually via a pipeline. As such there is no need for separate costly disposal of the fracturing fluid. However, the key drawback of using LPG as fracturing fluid is the relatively high cost of the LPG. A further drawback of LPG is that it changes the heat value as well as other important quality specifications of the product gas. This is especially a concern as LPG will not have sufficient time to diffuse through the reservoir and homogeneously mix with the product gas. As a consequence, the composition of the produced gas will fluctuate over time as the propane and butane concentration will be higher in the initial stages of production and decrease over the lifetime of the field. Quality fluctuations are likely to result in suboptimal downstream gas processing and/or combustion, for example an LPG extraction plant would need to be over-designed in order to handle the maximum LPG concentration during early production stages. Burners or engines running on the gas might need to be readjusted as the quality of the product gas changes.

U.S. Pat. No. 3,822,747 discloses the use of liquefied gas, in particular liquefied nitrogen, as a fracturing fluid, which is allowed to vaporize in the formation, thus fracturing the formation. Liquefied methane is mentioned as an alternative to liquid nitrogen for use in reservoirs of higher oil viscosity.

US 2010/0101796 teaches the use of nitrogen combined with a proppant supported by a viscosified liquid hydrocarbon and a viscosity breaker for fracturing subterranean formations.

US 2006/0065400 proposes to use liquefied natural gas (LNG) as a fracturing fluid. Proppants may be blended in prior to pumping the LNG into the well.

This invention addresses the drawbacks of LPG fracturing while still retaining most if not all of the advantages of LPG fracturing.

DESCRIPTION OF THE INVENTION

The invention generally pertains to a process for fracturing a subterranean formation, comprising the following steps:
a) providing a first fluid comprising at least 50 wt. % of methane,
b) providing a second fluid comprising at least 30 wt. % of the combination of propane and butane, preferably comprising, at least 50 wt. % of the combination of propane and butane,
c) mixing and optionally liquefying said first fluid and said second fluid to obtain a liquefied fluid mixture comprising 15-80 wt. % of methane and 15-80 wt. % of the combination of propane and butane,
said liquefied mixture having a temperature and a pressure such that the liquefied fluid stays above the bubble line of the mixture;
d) blending a proppant and/or a gellant into the liquefied fluid mixture to produce a fracturing fluid;
e) injecting the fracturing fluid into the subterranean formation.

In a first embodiment, the first and second fluid are provided in liquefied form. The process of the invention then comprises:
(a) providing a first liquefied fluid comprising at least 50 wt. % of methane, at a first temperature and a first pressure;
(b) providing a second liquefied fluid comprising at least 30 wt. %, preferably at least 50 wt. % of the combination of propane and butane, at a second temperature and a second pressure;

wherein said second pressure is substantially identical to said first pressure, and said second temperature differs less than 40 K, preferably less than 20 K from said first temperature;

(c) mixing 20-80 wt. % of said first liquefied fluid with 20-80 wt. % of said second liquefied fluid to produce a liquefied fluid gas mixture;

wherein said first temperature and said first pressure are such that said mixture stays above the bubble line of the mixture;

(d) blending a proppant and/or a gellant into the liquefied fluid mixture to produce a fracturing fluid;

(e) injecting the fracturing fluid into the subterranean formation.

Herein, a pressure which is "substantially identical" to another pressure means differing by less than 25%, preferably less than 10% from said other pressure. In absolute terms, said "substantially identical" pressure differs from said other pressure by less than 1000 kPa (10 bar), preferably by less than 500 kPa (5 bar).

Alternatively, the invention pertains to a process as described above, wherein liquefaction is performed after mixing the first and second fluids in gas form. Thus, in a further embodiment, the process of the invention can comprise the following steps:

aa. providing a first gas comprising at least 50 wt. % of methane;

bb. providing a second gas comprising at least 30 wt. %, preferably at least 50 wt. % of the combination of propane and butane;

cc. mixing said first gas with said second gas to produce a gas mixture, and cooling and/or pressurizing said gas mixture to obtain a liquefied gas mixture at a temperature and a pressure such that the liquefied gas stays above the bubble line of the mixture;

dd. blending a proppant and/or a gellant into the liquefied gas mixture to produce a fracturing fluid;

ee. injecting the fracturing fluid into the subterranean formation.

The first (liquefied) gas is preferably natural gas. It typically comprises 60-98 wt. %, more in particular 75-95 wt. % of methane, 0-20 wt. % of ethane, and minor amounts of further components such as higher alkanes, nitrogen, carbon dioxide, helium and the like.

The second (liquefied) gas is preferably derived from liquefied petroleum gas (LPG). This means that it can be any combination of alkanes comprising at least 50 wt. %, preferably at least 70 wt. %, most preferably at least 90 wt. % of the combination of propane and butane, ranging from almost exclusively propane to almost exclusively butane (including isobutane). Minor amount of other alkanes, such as ethane, pentane, and alkenes, such as propene and butene, may also be present. Preferably at least 30 wt. % of the second fluid comprises propane and/or at least 30 wt. % of the second fluid comprises butane. Volume ratios may be calculated from weight ratio's and vice versa using the molar weight of propane and butane of 44 and 58, respectively. Thus a 50:50 ratio by volume corresponds to an about 43:57 ratio of propane to butane by weight. The relative amounts of the first and second (liquefied) fluids are preferably 20-80 wt. % of the first, methane-containing fluid and 20-80 wt. % of the second, propane- and/or butane-containing fluid. More preferably 40-75 wt. % of said first (liquefied) fluid is mixed with 25-60 wt. % of said second (liquefied) fluid.

In the first embodiment, wherein the fluids are mixed in the liquid state, the first liquefied fluid upon mixing (i.e. just before mixing) has a temperature of between −180° C. and −40° C. (93-233 K) and a pressure of between 25 and 250 bar (2.5-25 MPa), preferably a temperature of between −160° C. and −60° C. (113-213 K) and a pressure of between 25 and 100 bar (2.5-10 MPa). Most preferred conditions are a temperature between −120 and −80° C. (153-193 K) and a pressure between 30 and 100 bar (3-10 MPa). The temperature and pressure of the second fluid upon mixing has a temperature of between −140° C. and +20° C. (133-293 K) and a pressure of between 25 and 225 bar (2.5-22.5 MPa), preferably a temperature of between −110° C. and 0° C. (163-273 K) and a pressure of between 30 and 100 bar (3-10 MPa).

In the second embodiment wherein the gases are mixed in the gaseous state, the mixture is cooled and/or pressurised in step (cc) until the liquefied gas mixture has a temperature of between −180° C. and −40° C. (93-233 K) and a pressure of between 1 and 250 bar (100 kPa-25 MPa), preferably a temperature of between −120° C. and −60° C. (153-213 K) and a pressure of between 10 and 200 bar (1-20 MPa), most preferably between 30 and 100 bar (3-10 MPa).

In a particularly preferred embodiment of the process of the invention, gas produced by the field related to (i.e. located within the same geological basin) or close to subterranean formations being fractured can be used for obtaining the (liquefied) fluid mixture for use as the fracturing fluid. When a well contains relatively high levels of propane and/or butane, for example as a result of a recent LPG fracturing job, the gas produced from it can then be used to make up all or part of the second fluid containing substantial levels of propane and or butane.

Where a well has been productive for a longer period, the gas produced from it will be closer to a natural gas composition, i.e. contain relatively high levels of methane. This gas can then be used as the first fluid containing substantial levels of methane. In both situations, the relative amounts of first (methane-rich) and second (propane/butane-rich) fluids that are mixed are such that the resulting gas mixture contains 15-80, preferably 30-70 wt. % methane, and 15-80, preferably 25-65 wt. % of propane and/or butane. The formations from which the gas components of the fracturing fluid are produced are thus related to the formation to be fractured, i.e. they belong to the same field or they are at a distance of less than 20 km or even less than 10 km.

If necessary in view of the subterranean condition for optimizing the injection process, the liquefied gas mixture may, prior to or after step (d), but preferably after step (d), be further pressurized to a pressure between 150 and 300 bar (15-30 MPa), preferably between 200 and 250 bar (20-25 MPa), prior to injection into the subterranean formation. It is preferred that the critical temperature of the gas mixture is above the injection temperature, in particular at least 10° C., more in particular at least 20° C. above the injection temperature. Depending on the subterranean conditions, the injection temperature is between 0 and 100° C. (273-373 K), preferably between 15 and 80° C. (288-353 K).

Benefits of Using NG/LPG Blend

LPG is usually higher priced than natural gas on a heating value basis. A longer term price differential with respect to natural gas is required to provide an economic incentive to extract LPG from natural gas and sell as a separate product. LPG prices are generally linked to crude oil as LPG is also extracted from crude oil and because LPG competes with other crude oil-based fuels.

In a scenario of high oil prices and low natural gas prices the price differential between LPG and natural gas can be significant e.g. a factor two or more. Blending LPG down with NG can therefore reduce the costs of the fracturing liquid.

Another benefit of using an NG/LPG blend is a more consistent quality of the produced natural gas. Natural gas consists mainly of methane. Natural gas can contain propane and butane but in concentrations that are less than 40% (propane and butane combined) and in most cases even less than 10% combined.

Blending of LPG with NG will reduce the quality fluctuation significantly as the NG/LPG blend has a methane/(propane+butane) ratio that is closer to the natural gas already present in the reservoir. As a result the heat value and other important quality parameters of the NG/LPG fracturing fluid will be much closer to the product gas than that of an LPG fracturing fluid.

Product gas is a natural gas, thus locally produced natural gas can be used to prepare the NG/LPG blend, which would significantly reduce the need for trucking. Even in case the NG is brought in via trucks in the form of Liquefied Natural Gas (LNG), it will still reduce the overall tonnage of fluid that needs to be trucked as the density of the NG/LPG blend when injected into the reservoir is lower than the density of pure LPG, as shown in the tables below.

While blending LPG with NG, one needs to assure that the NG/LPG blend has a critical temperature that is higher than the temperature of the blend in the subterranean formation to assure the blend is still a fluid when injected.

The table below gives exemplary NG and LPG compositions:

|         | NG1 | NG2 | LPG1 | LPG2 | LPG3 |
|---------|-----|-----|------|------|------|
| methane | 100 | 92  | 0    | 0    | 0    |
| ethane  | 0   | 8   | 0    | 0    | 0    |
| propane | 0   | 0   | 100  | 0    | 50   |
| butane  | 0   | 0   | 0    | 100  | 50   |

When blended at 70% NG and 30% LPG, this results in the following blend compositions 1-6, with the following characteristics at 200 bar/30° C. (20 MPa/303 K), compared to propane and butane:

|                          | blend 1 | blend 2 | blend 3 | blend 4 | blend 5 | blend 6 | LPG 1 | LPG 2 |
|--------------------------|---------|---------|---------|---------|---------|---------|-------|-------|
| methane                  | 70      | 70      | 70      | 64.4    | 64.4    | 64.4    | 0     | 0     |
| ethane                   | 0       | 0       | 0       | 5.6     | 5.6     | 5.6     | 0     | 0     |
| propane                  | 30      | 0       | 15      | 30      | 0       | 15      | 100   | 0     |
| butane                   | 0       | 30      | 15      | 0       | 30      | 15      | 0     | 100   |
| fluid density (g/cm$^3$) | 0.28    | 0.34    | 0.31    | 0.30    | 0.35    | 0.33    | 0.51  | 0.56  |
| Tc (° C.)                | 12      | 57      | 35      | 18      | 61      | 40      | 97    | 152   |

|                          | blend 7 | blend 8 | blend 9 | blend 10 | blend 11 | blend 12 | LPG 1 | LPG 2 |
|--------------------------|---------|---------|---------|----------|----------|----------|-------|-------|
| methane                  | 55.2    | 55.2    | 46      | 46       | 36.8     | 36.8     | 0     | 0     |
| ethane                   | 4.8     | 4.8     | 4       | 4        | 3.2      | 3.2      | 0     | 0     |
| propane                  | 40      | 0       | 50      | 0        | 60       | 0        | 100   | 0     |
| butane                   | 0       | 40      | 0       | 50       | 0        | 60       | 0     | 100   |
| fluid density (g/cm$^3$) | 0.34    | 0.40    | 0.38    | 0.44     | 0.41     | 0.47     | 0.51  | 0.56  |
| Tc (° C.)                | 37      | 86      | 52      | 105      | 65       | 119      | 97    | 152   |

NG2 blended with 40%, 50% and 60% propane and butane will result in the blend compositions 7-12 above, with the following characteristics at 200 bar/30° C. (2000 kPa/303 K), compared to propane and butane.

The above data show that when LPG is blended with NG, the critical temperature will decrease compared to LPG, but as long as the critical temperature of the blend stays above its injection temperature, a considerable amount of NG can be blended with LPG, lowering the costs of the fracturing fluid.

Fracturing requires the injection of a fluid at very high injection rates at high pressures. The pressurization at high injection rates is only practically and economically feasible by pressurizing in the liquid rather than the gaseous phase.

Therefore the NG to be blended will first have to be cooled so it is a liquid at low to medium pressures, by cooling the temperature of the NG to less than −80° C. (193 K) and typically less than −150° C. (123 K). This liquefaction of NG can either be done on-site but can also be done remotely and with the resulting LNG trucked in.

The NG/LPG mix is subsequently made as follows:

Pressurize LNG and pressurize LPG individually to a pressure at which they will be blended (see FIG. 1). Possibly pre-heat the LNG and/or pre-cool the LPG before the blending process to minimize the temperature difference between the individual components. This pre-heating/pre-cooling can possibly be done by heat exchange between the two blending components. In case of preheating the LNG one needs to ensure that the LNG stays in a liquid phase before and during the pressurization.

Blend the LNG and LPG.

Possibly further increase the pressure and/or temperature of the resulting NG/LPG mixture prior to injection. A possible further pressure increase is best done in a liquid phase, hence if further pressure increase of the NG/LPG blend is required, one needs to ensure that the blend is fully or mostly in the liquid phase.

In case viscosity needs to be increased and proppants added, this can be either done to the LPG stream after or before blending with the LNG, but preferentially after blending as gel and proppant may complicate the blending process.

A preferred proppant is selected from sand particles, ceramic particles and mixtures thereof. A preferred gellant is selected from gelling agents known by the skilled person to be suitable for gelling hydrocarbon-based fluids. For example, suitable gelling agents may include polyvalent metal complexes of orthophosphoric acid esters, alkylphosphonic acid esters, or of unsymmetrical or symmetrical dialkylphosphinic acids or mixtures thereof. The polyvalent metal preferably comprises iron or aluminium. Examples of such iron or aluminium polyvalent metal salts of alkylphosphonic acid esters are provided in U.S. Pat. No. 6,511,944.

The amounts of gellants and proppants can be selected by technicians taking into account the specific conditions and requirements of the formation to be fractured. For example, a proppant is preferably used at a level of between 25 and 250 kg per m$^3$ of liquefied mixture, more preferably 50-200 kg/m$^3$, or at a level of 5-50, more preferably 10-40 wt. %. A gellant may be used at a level of 0.05-5 wt. %, preferably 0.1-2 wt. % of the liquefied mixture. In addition, further components, such as breakers, complexants and surfactants may be present.

Another option to obtain a NG/LPG liquid at high pressure is by starting with an NG/LPG mix in the gaseous or liquid/vapour phase and subsequently cool this mixture either at site or remotely to obtain a liquid NG/LPG mix. This liquid can then be pumped to the pressure and if needed be heated to a temperature required for injection. In case the viscosity needs to be increased and proppants added, this is preferably done after liquefaction of the mix, as gelling agent and proppant may complicate the liquefaction process.

DESCRIPTION OF THE FIGURE

The appending FIGURE depicts a phase diagram for a blend of (liquefied) natural gas and (liquefied) petroleum gas and the production of such a blend according to the invention. The solid line represents the dew line of the blend and the dashed line represents the bubble line. The solid square (■) is the critical point. The lower left arrow (1) and the lower right arrow (2) represent the pressurization of the first fluid (NG) and the second fluid (LPG), respectively, and the two horizontal arrows (3) and (4) represent the heating or cooling of the first and second fluid to a point at the high pressure side of the bubble line. The upper arrow (5) represents further pressurization to injection pressure.

The invention claimed is:

1. A process for fracturing a subterranean formation, comprising:
   (a) mixing a first liquefied fluid comprising at least 50 wt. % of methane and a second liquefied fluid comprising at least 50 wt. % of a combination of propane and butane to obtain a liquefied fluid mixture comprising 15-80 wt. % of methane and 15-80 wt. % of the combination of propane and butane, wherein the liquefied mixture has a temperature and a pressure such that the liquefied fluid stays above the bubble line of the mixture;
   (b) blending a proppant and/or a gellant into the liquefied fluid mixture to produce a fracturing fluid; and
   (c) injecting the fracturing fluid into the subterranean formation.

2. The process according to 1, wherein the liquefied fluid mixture is obtained by:
   (i) providing the first liquefied fluid at a first temperature and a first pressure;
   (ii) providing the second liquefied at a second temperature and a second pressure, wherein the second pressure is substantially identical to the first pressure, and the second temperature differs less than 40 K from the first temperature;
   (iii) mixing 20-80 wt. % of the first liquefied fluid with 20-80 wt. % of the second liquefied fluid to produce a liquefied fluid gas mixture, wherein the first temperature and the first pressure are such that the mixture stays above the bubble line of the mixture.

3. The process according to claim 2, wherein the first liquefied fluid before mixing has a temperature between 93K and 233K and a pressure of between 2.5 and 25 MPa.

4. The process according to claim 3, wherein the first liquefied fluid before mixing has a a temperature of between 113K and 213K and a pressure of between 2.5 and 10 MPa.

5. The process according to claim 2, wherein the second liquefied fluid before mixing has a temperature of between 133K and 273K and a pressure of between 2.5 and 25 MPa.

6. The process according to claim 5, wherein the second liquefied fluid before mixing has a temperature between 153K and 253K and a pressure of between 2.5 and 10 MPa.

7. The process according to claim 2, wherein the second temperature differs less than 20K from the first temperature.

8. The process according to claim 1, wherein the liquefied fluid mixture, prior to or after step (b), is further pressurized to a pressure between 20 and 30 MPa, prior to injection into the subterranean formation.

9. A process according to claim 1, wherein the first fluid comprises 75-95 wt. % of methane.

10. The process according to claim 9, wherein the first fluid comprises natural gas.

11. The process according to claim 1, wherein the second fluid is derived from liquefied petroleum gas.

12. The process according to claim 1, wherein 40-75 wt. % of the first fluid is mixed with 25-60 wt. % of the second fluid.

13. The process according to claim 1, wherein the critical temperature of the liquefied fluid mixture is above the injection temperature.

14. The process according to claim 13, wherein the injection temperature is between 273 and 373K.

15. The process according to claim 1, wherein the proppant is selected from sand particles, ceramic particles and mixtures thereof.

16. The process according to claim 1, wherein the gellant is selected from polyvalent metal complexes of orthophosphoric acid esters, alkylphosphonic acid esters, dialkylphosphinic acids, waxes, gums and polyamides.

17. A process for fracturing a subterranean formation, comprising:
    (a) mixing a first gas comprising at least 50 wt. % of methane and a second gas comprising at least 50 wt. % of a combination of propane and butane to obtain a gas mixture, and liquefying the gas mixture to obtain a liquefied gas mixture comprising 15-80 wt. % of methane and 15-80 wt. % of the combination of propane and butane,
    wherein the liquefied gas mixture has a temperature and a pressure such that the liquefied gas stays above the bubble line of the mixture;
    (b) blending a proppant and/or a gellant into the liquefied fluid mixture to produce a fracturing fluid; and
    (c) injecting the fracturing fluid into the subterranean formation.

18. The process according to claim 17, wherein the liquefied gas mixture is obtained by:
    (i) providing the first gas;
    (ii) providing the second gas;
    (iii) mixing 20-80 wt % of the first gas with 20-80 wt % of the second gas to produce a gas mixture, and cooling and/or pressurizing the gas mixture to obtain the liquefied gas mixture at a temperature and a pressure such that the liquefied gas stays above the bubble line of the mixture.

19. The process according to claim 18, wherein, in step (iii) the gas mixture is cooled and/or pressurised until the liquefied gas mixture has a temperature between 93K and 233K and a pressure of between 100 kPa and 25 MPa.

20. The process according to claim 19, wherein, in step (iii) the gas mixture is cooled and/or pressurised until the liquefied gas mixture has a temperature between 153K and 213K and a pressure of between 3 and 10 MPa.

21. The process according to claim 18, wherein the first gas is derived from a subterranean formation within the same geological basin as the subterranean formation to be fractured.

22. The process according to claim 18, wherein the second gas is derived from a subterranean formation within the same geological basin as the subterranean formation to be fractured.

* * * * *